(12) United States Patent
Menon et al.

(10) Patent No.: US 7,876,694 B2
(45) Date of Patent: Jan. 25, 2011

(54) IDENTIFYING VPN FAULTS BASED ON VIRTUAL ROUTING ADDRESS AND EDGE INTERFACE RELATIONSHIP INFORMATION

(75) Inventors: Sunil Menon, Cupertino, CA (US); Damian Horner, Belfast (GB); Anil A Kuriakose, Kottayam (IN); Swamy Mandavilli, Fort Collins, CO (US); Robert Strahan, Herndon, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1902 days.

(21) Appl. No.: 10/884,468

(22) Filed: Jul. 2, 2004

(65) Prior Publication Data

US 2006/0002409 A1     Jan. 5, 2006

(51) Int. Cl.
*H04J 1/16* (2006.01)
*H04J 3/14* (2006.01)

(52) U.S. Cl. .................. 370/245; 370/241; 370/243; 370/244

(58) Field of Classification Search .............. 709/223, 709/224, 225, 226, 238, 230, 231, 232, 233, 709/234, 235, 237, 239, 240, 241, 242, 243, 709/244, 245; 790/236; 370/464, 901, 902, 370/903, 913, 351, 352, 389, 229, 241, 241.1, 370/242, 243, 244, 245, 246, 247

See application file for complete search history.

(56) References Cited

PUBLICATIONS

Nadeau et al., MPLS/BGP Virtual Private Network Management Information Base Using SMIv2, Nov. 2002, Internet Engineering Task Force (IETF), Internet Draft.*
Nadeau et al., MPLS/BGP Virtual Private Network Management Information Base Using SMIv2, Nov. 2002, Internet Engineering Task Force (IETF), Internet Draft, all pages.*
Frigo et al., Engineering Report MPLS-VPN, Mar. 30, 2001, Cisco Systems, all pages.*

\* cited by examiner

*Primary Examiner*—Kwang B Yao
*Assistant Examiner*—Adam Duda

(57) ABSTRACT

In an embodiment, a network service provider (NSP) operates a provider network to provide VPN services to its customers. A VPN links various customer sites allowing customers to send data between these sites over the NSP network. Each site network includes a customer edge router (CE) while the provider network includes a plurality of provider edge routers (PEs) to communicate with the CEs. The PEs include virtual routing address (VRFs), and the PEs and CEs include interfaces (IFs). A database stores information related to the relationships between the network components (e.g., VPNs, PEs, CEs, VRFs, IFs, etc.), and a management software package (MSP) has access to the database. When a fault occurs, the MSP, based on collected information and information in the database, determines the impacted network components. Other features include classifying the seriousness of the network's faults and representing different faults by a color scheme.

27 Claims, 13 Drawing Sheets

| | 710C | 720C | 730C |
|---|---|---|---|
| 710 | CE down<br>CE-IF facing PE accessible | Receive event CE node_down and event PE IF_down | From event CE node_down, use CE to VPN logic to identify impacted VPN. From event PE IF_down, use IF-VRF-VPN logic to identify impacted VPN. Co-relate information and generate event VPN_impacted by CE node down |
| 720 | CE down<br>CE accessible | Receive event CE node_down and event PE IF_down | From event CE node down, use CE to VPN logic to identify impacted VPN. From event PE IF_down, use IF-VRF-VPN logic to identify impacted VPN. Co-relate information and generate event VPN_impacted by CE node down |
| 730 | CE-IF facing PE down<br>CE-IF facing PE accessible | Receive event CE-IF_down and event PE IF_down | From event CE IF_down, use CE-IF to VPN logic to identify impacted VPN. From event PE IF_down, use IF-VRF-VPN logic to identify impacted VPN. Co-relate information and generate event VPN_impacted by CE IF_down |
| 740 | CE-IF facing PE down<br>CE accessible | Receive event CE IF_down and event PE IF_down | From event CE IF_down, use CE-IF to VPN logic to identify impacted VPN. From event PE IF_down, use IF-VRF-VPN logic to identify impacted VPN. Co-relate information and generate event VPN_impacted by CE IF_down |
| 750 | PE down<br>CE not accessible | Receive event PE node_down | From event PE node_down, for each IF associated with PE, use IF-VRF-VPN logic to identify impacted VPN(s). Generate event listing impacted VPN(s) by PE node down |

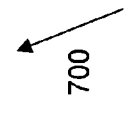

FIG. 7

| | | | |
|---|---|---|---|
| 760 | PE down CE accessible | Receive event PE node_down and event CE IF_down | From event PE node_down, for each IF associated with PE, use IF-VRF-VPN logic to identify impacted VPN(s). From event CE IF_down, use CE-IF to VPN logic to identify impacted VPN(s). Co-relate information and generate event listing impacted VPN(s) by PE node down |
| 770 | PE-IF down CE not accessible | Receive event PE IF_down | From event PE IF_down, use IF-VRF-VPN logic to identify impacted VPN. Capture status Unknown of CE-IF, use CE-IF to VPN logic to identify impacted VPN. Co-relate information and generate event listing impacted VPN(s) by PE IF_down |
| 780 | PE-IF down CE accessible | Receive event PE IF_down and event CE IF_down | From event PE IF_down, use IF-VRF-VPN logic to identify impacted VPN. From event CE IF_down, use CE-IF to VPN logic to identify impacted VPN. Co-relate information and generate event listing impacted VPN by PE IF_down |
| 790 | PE-PE VRF-unaware test timeout | Receive event timeout, information of initiator and destination PEs | For each IF associated with initiator PE, use IF-VRF-VPN logic to identify a first list of potential impacted VPN(s). For each IF associated with destination PE, use IF-VRF-VPN logic to identify a second list of potential impacted VPN(s). Identify the intersection of the two lists as the impacted VPN(s) |

FIG. 7 (Continued)

| | | |
|---|---|---|
| 791 | PE-PE VRF-aware test timeout | Receive event timeout, information of initiator and destination PEs, VRF used in the test | From the known VRF used in the test, use the VRF-VPN logic to identify the impacted VPN |
| 792 | CE-CE connectivity test timeout | Receive event timeout, information of initiator PE and CE, and of destination PE and CE | Collect information from initiator PE-CE test, PE initiator to PE destination test, and destination PE-CE test, identify impacted VRFs, and from this, use VRF-VPN logic to identify impacted VPNs |

FIG. 7 (Continued)

| | 810C | 820C | 830C |
|---|---|---|---|
| 810 | CE down<br>CE-IF facing PE accessible | Receive event CE status Unknown and event PE IF_down | Based on event PE IF_down, set INF status of PE IF and VRF to Critical. Based on event CE status Unknown, identify PE IF and VRF; set CON status of PE IF and VRF to Critical. Increase status counters for VRF for both INF and CON. Calculate status for VPN based on status of VRF |
| 820 | CE down<br>CE accessible | Receive event CE node_down and event PE IF_down | Based on event PE IF_down, set INF status of PE IF and VRF to Critical. Based on event CE node_down, identify PE IF and VRF; set CON status of PE IF and VRF to Critical. Increase status counters for VRF for both INF and CON. Calculate status for VPN based on status of VRF |
| 830 | CE-IF facing PE down<br>CE-IF facing PE accessible | Receive event CE IF_down and event PE IF_down | Based on event PE IF_down, set INF status of PE IF and VRF to Critical. Based on event CE IF_down, identify PE IF and VRF; set CON status of PE IF and VRF to Critical. Increase status counters for VRF for both INF and CON. Calculate status for VPN based on status of VRF |
| 840 | CE-IF facing PE down<br>CE accessible | Receive event CE IF_down and event PE_IF down | Based on event PE IF_down, set INF status of PE IF and VRF to Critical. Based on event CE IF_down, identify PE IF and VRF; set CON status of PE IF and VRF to Critical. Increase status counters for VRF for both INF and CON. Calculate status for VPN based on status of VRF |
| 850 | PE down<br>CE not accessible | Receive event PE down and status CE Unknown | Get all IFs and VRFs related to that PE. For all PE IFs and VRFs, set INF and CON status to Critical. Increase status counters for VRF for both INF and CON. Calculate status for VPN(s) based on status of VRF. |

FIG. 8

| | | | |
|---|---|---|---|
| 860 | PE down<br>CE accessible | Receive event PE down and event CE IF_down | For all PE IFs and VRFs, set INF and CON status to Critical. Increase status counters for VRF for both INF and CON. Calculate status for VPN(s) based on status of VRF(s). |
| 870 | PE-IF down<br>CE not accessible | Receive event PE-IF_down and CE-IF Unknown | Based on event PE IF_down, set INF status of PE IF and VRF to critical. Based on event CE status Unknown, identify PE IF and VRF; set CON status of PE IF and VRF to Critical. Increase status counters for VRF for both INF and CON. Calculate status for VPN based on status of VRF |
| 880 | PE-IF down<br>CE accessible | Receive event PE-IF_down and event CE-IF_down | Based on event PE IF_down, set INF status of PE IF and VRF to critical. Based on event CE status Unknown, identify PE IF and VRF; set CON status of PE IF and VRF to Critical. Increase status counters for VRF for both INF and CON. Calculate status for VPN based on status of VRF |
| 890 | PE-PE VRF unaware test time out | Receive event timeout, information of initiator and destination PEs | Find the impacted VPNs as in 790. For each VPN 1) Find the impacted VRFs 2) Increase status counter for VRF for CON 3) Calculate status VPN based on status of corresponding VRF |

FIG. 8 Continued

| | | | |
|---|---|---|---|
| 891 | PE-PE VRF test timeout | Receive event timeout, information of initiator and destination PEs, VRF used in the test | For the impacted VRF (which is known by nature of the test), set the counter for CON. Calculate status for VPN (which is known by nature of the test) |
| 892 | CE-CE test timeout | Receive event timeout, information of initiator PE and CE, and of destination PE and CE | Collect information from initiator PE-CE test, PE initiator to PE destination test, and destination PE-CE test, identify impacted VRFs, and from this, use VRF-VPN logic to identify impacted VPNs. For each VPN set counter for impacted VRFs for CON. Calculate status for VPN |

FIG. 8 Continued

IDENTIFYING VPN FAULTS BASED ON VIRTUAL ROUTING ADDRESS AND EDGE INTERFACE RELATIONSHIP INFORMATION

FIELD OF THE INVENTION

The present invention relates generally to Virtual Private Networks (VPN) and, more specifically, to faults and status in such networks.

BACKGROUND OF THE INVENTION

VPN networks become more and more complicated because they are involved with various complicated software and hardware. As a result, determining faults and status of components in such networks becomes more and more challenging. Quickly performing such determining task to service the affected areas is critical when users depend on the network to perform their own tasks.

SUMMARY OF THE INVENTION

The present invention, in various embodiments, provides techniques for determining faults and status of a network. In an embodiment, the network is related to a provider network and a plurality of virtual private networks (VPNs). A network service provider (NSP) operates the provider network to provide network services to its customers by offering VPN services. A VPN links various customer sites allowing customer to send multimedia data between different sites transparently over NSP network using MPLS (Multi-Protocol Label Switching) technology. Each site network includes a router, referred to as a customer edge (CE), because it is at the "edge" of the customer sites to communicate with the provider network. The provider network includes a plurality of routers, referred to as provider edges (PEs), because they are at the edge of the provider network to communicate with the CEs of the VPNs. The PEs include virtual routing address (VRFs), and the PEs and CEs include interfaces (IFs). A database stores information related to the relationships between the network components (e.g., VPNs, PEs, CEs, VRFs, IFs, etc.) while a management software package (MSP) has access to the database. When a fault occurs to a network component, the MSP, based on the information in the database, determines other components affected by the problematic component. For example, when an IF fails, the MSP determines the VRF affected by the failed IF; when a PE fails, the MSP determines all VPNs affected by the failed PE, etc.

Seriousness of the network's faults is classified as "infrastructure" and "reachability," and the seriousness level is classified as critical, major, warning, normal, etc. Such seriousness level is classified depending on the percentage of failure of one or a combination of the infrastructure and reachability.

A color scheme provides different colors to different network components as a color map. Levels of problem seriousness of the network components are also represented by different colors. When a network component fails, the color representing the failed component changes to a different color. As a result, a user, from the color map, can quickly identify a failed component and/or affected areas.

BRIEF DESCRIPTION OF THE DRAWINGS

The present invention is illustrated by way of example, and not by way of limitation, in the figures of the accompanying drawings in which like reference numerals refer to similar elements and in which:

FIG. 7 shows a table embodiment for use in determining root-cause faults of the network in FIG. 1;
FIG. 8 shows a table embodiment for use in indicating status of the network in FIG. 1 and its components.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
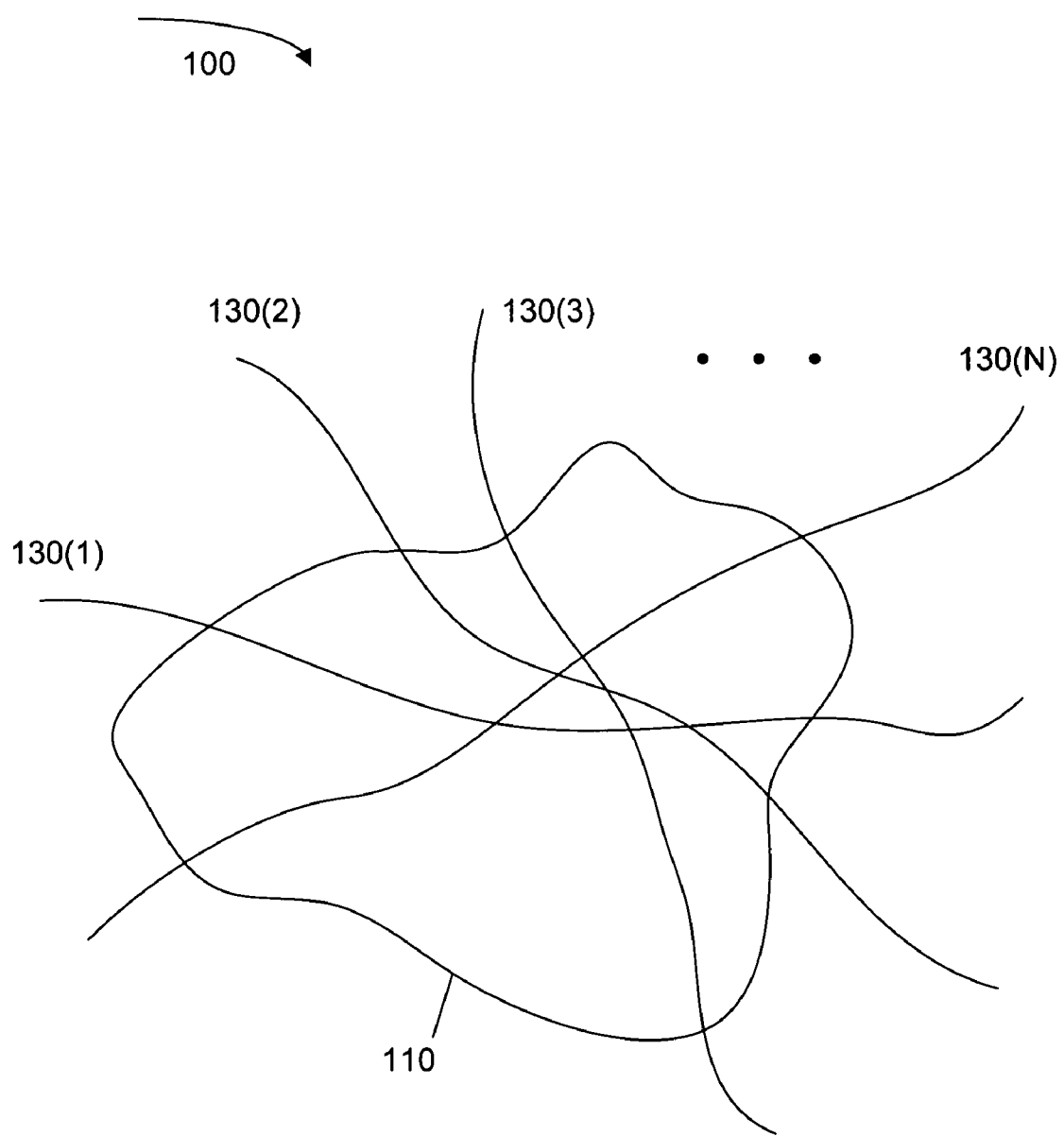
FIG. 1 shows a computing network embodiment.

FIG. 1 shows a computing network embodiment 100 that includes a provider network 110 serving a plurality of virtual private networks (VPNs) 130.

Provider network 110 is generally owned and/or operated by a network service provider (NSP) such as AT & T, Sprint, MCI, British Telecom, Vodacom, etc. Provider network 110 includes various network components with hardware and software that provide services to the NSP's customers, such as Hewlett Packard Co. (HP), Safeway, RiteAid, Bank of America, etc. Examples of these services include sending emails and/or data between various sites of the customers. Examples of data include voice, multi-media, video, etc. Generally, services provided by network 110 are based on a Service Level Agreement (SLA) between the NPS and its customers.

VPNs 130 allow only authorized users to access such networks and ensure that unauthorized users cannot have access and/or intercept data transmitted in the networks. These VPNs 130 are thus "virtually private" to those authorized users. VPNs 130 include appropriate hardware, software, security mechanisms, etc., to keep the network virtually private. In the embodiment of FIG. 1, each company, e.g., HP, IBM, Cisco System, etc., has a VPN for its employees to communicate/transmit data over the company's VPN. Each VPN 130 in FIG. 1 is shown as a single line for illustration purposes only, a VPN includes various components of hardware, software, network elements, among others, to function as a network linking various computer systems, electronic devices, etc. In an embodiment, a VPN 130 of a company links computing networks-including network components of that company at various physical sites via network components of a network service provider, such as components that constitute provider network 110. Depending on implementations, VPNs 130 may use the MPLS (Multi-Protocol Label Switching) technology. MPLS is an Internet Engineering Task Force (IETF) initiative that integrates Layer 2 information about network links (bandwidth, latency, utilization, etc.) into Layer 3 (IP) to simplify and improve EP-packet exchanges.

Figure 2:
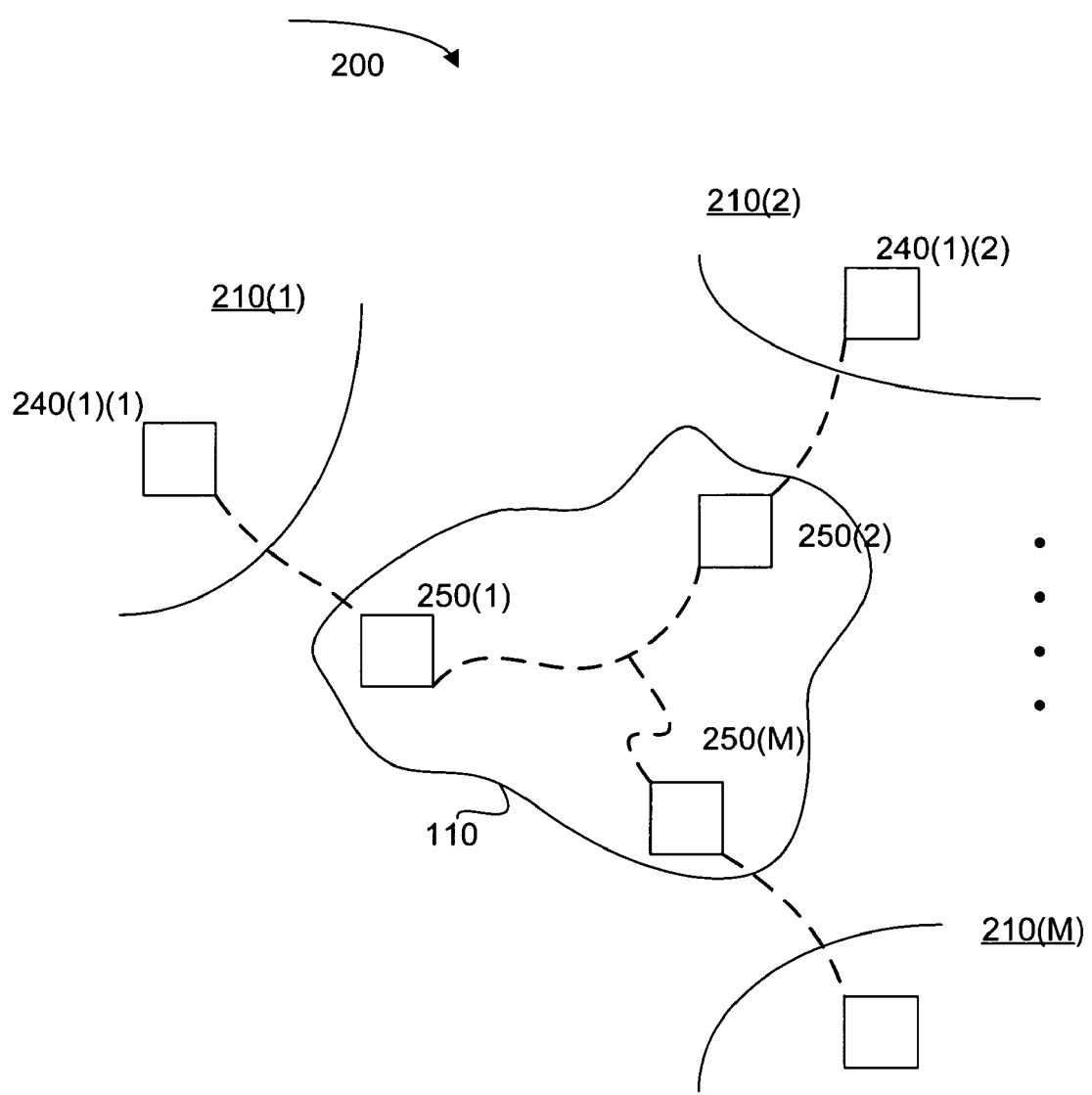
FIG. 2 shows an embodiment of a virtual private network of the computing network in FIG. 1.

FIG. 2 shows a network 200 being an exemplary VPN 130, e.g., VPN 130(1) for HP, in accordance with an embodiment. Network 200 links a plurality of sites 210 of HP using services of provider network 110. Normally, sites 210 are physically apart from one another. For example, site 210(1) is in Atlanta, Ga.; site 210(2) is in Cupertino, Calif.; site 210(3) is in Houston, Tex., etc. Each site 210 includes its own computing network(s) connecting various network components (not shown). For illustration purposes, each site 210 includes a customer edge (CE) 240, which is a router that routes data between provider network 110 and network components in the site 210. Routers 240 are referred to as "customer edges" because, conceptually, they are at the edge of sites 210 to communicate with outside of site 210, e.g., with provider network 110, generally, via PEs 250.

For illustration purposes, a customer edge 240 is referred to as a CE 240(I)(J) wherein the index I is associated with a customer and the index J is associated with the site of a customer. For example, when I=1, the CE is associated with HP; when I=2, the CE is associated with IBM; and when I=3, the CE is associated with Cisco System, etc. For further illustration purposes, if HP has M number of sites, then the M number of CEs associated with the M number of sites may be referred to as CE 240(1)(1) to CE 240(1)(M). If IBM has N sites, then the N CEs associated with the N sites may be referred to as CE 240(2)(1) to CE 240(2)(N). Similarly, if Cisco has L sites, then the L CEs associated with the L sites may be referred to as CE 240(3)(1) to CE 240(3)(L), etc. In the example of FIG. 2, VPN 130(1) belongs to HP having M sites. As a result, the M CEs 240 associated with the M sites in FIG. 2 are referred to as CE 240(1)(1) to 240(1)(M) as shown. Generally, a VPN 130 includes more than one CE, but a CE is associated with one VPN 130. That is the CE associated with VPN 130(1) is not associated with another VPN, e.g., VPN 130(2) or 130(3), etc.

Provider network 110 includes provider edges (PEs) 250, which are routers that route data between provider network 110 and customer sites 210, generally, via customer edges 240. Routers 250 are referred to as "provider edges" because, conceptually, they are at the edge of provider network 110 to communicate with sites 210. For illustration purposes, data in a network in an initiator site 210 reaches a CE 240 of that site, travels through a first PE 250 corresponding to that CE 240. The data then reaches a second PE 250 to reach a CE 240 of a destination site, from which the data is transmitted through the network of the destination site.

Figure 3:
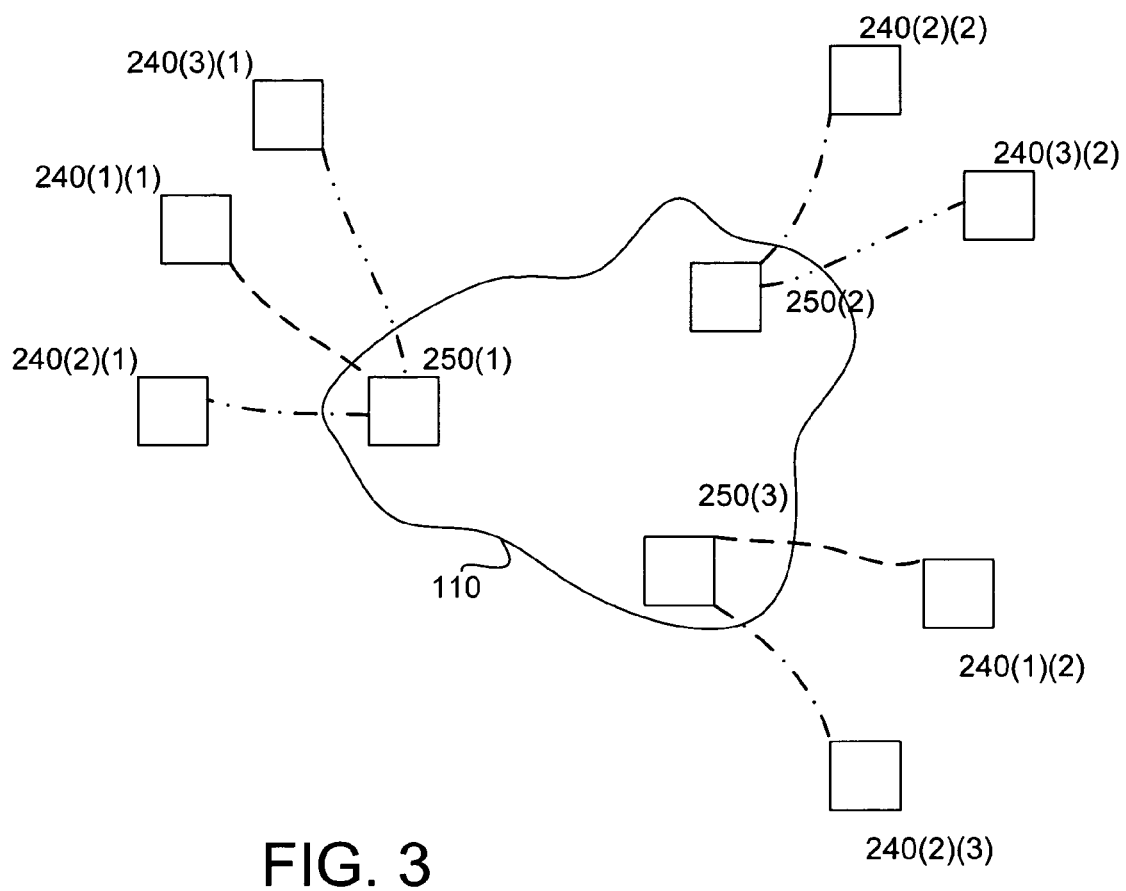
FIG. 3 illustrates a provider-edge router communicating with a plurality customer-edge routers.

In the example of FIG. 2, because only one VPN 130(1) is shown, each PE 250 is shown associated with one CE 240 of VPN 130(1). However, a PE 250 may be associated with multiple CEs 240 of the same VPN 130. Further, a PE 250 is generally associated with more than one VPN 130. That is, more than one VPN 130 may use a particular PE 250. Therefore, a PE 250 may communicate with more than one CE 240 of different VPNs 130 or customers, which is illustrated in FIG. 3. For illustration purposes, in FIG. 3, VPN 130(1) of HP is represented by the dashed line; VPN 130(2) of IBM is represented by the dot-dashed line; and VPN 130(3) of Cisco is represented by the dot-dot-dashed line. Further, FIG. 3 shows that PE 250(1) is used by VPN 130(1) of HP, VPN 130(2) of IBM, and VPN 130(3) of Cisco, and is associated with CE 240(1)(1) of HP, CE 240(2)(1) of IBM, and CE 240(3)(1) of Cisco. PE 250(2) is used by VPN 130(2) of IBM and VPN 130(3) of Cisco, and is associated with CE 240(2)(2) of IBM and CE 240(3)(2) of Cisco, respectively. PE 250 (3) is used by VPN 130(1) of HP and VPN 130(2) of IBM, and is associated with CE 240(1)(2) of HP and CE 240(2)(3) of IBM, etc. FIG. 3 is used for illustration purposes only, the invention is not limited by the number of VPNs 130 that use a particular PE 250. A CE 240 and a PE 250 may be referred to as a network node.

PEs 250 are connected together and with CEs 240 via interfaces (IFs). Between a pair of routers, e.g., a PE 250 to a PE 250 or a PE 250 to a CE 240, there is an IF at a first router and another IF at the other router. At a PE 250, a virtual routing address (VRF) logically groups the number of IFs of a VPN 130. Because, with respect to a particular VPN 130, a PE 250 is generally connected to a plurality of CEs 240 and PEs 250, a VRF is associated with a plurality of IFs each being used to connect to a CE 240 or a PE 250. Further, because a PE 250 may be used by a plurality of VPNs 130, a PE 250 is associated with a plurality of VRFs each corresponding to a VPN 130.

Figure 4:
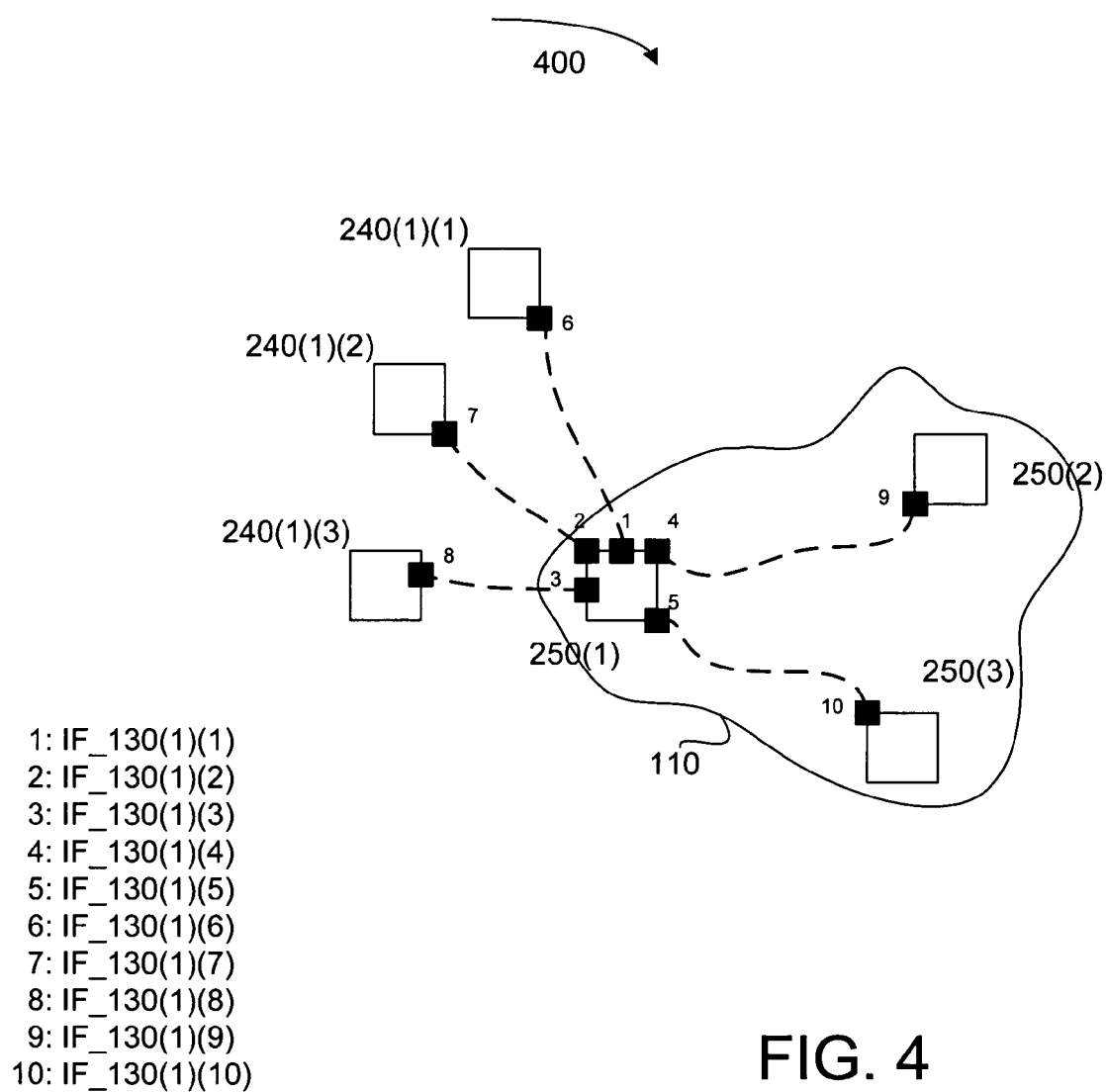
FIG. 4 is used to illustrate the relationships between interfaces and virtual routing address.

FIG. 4 shows a network 400 illustrating the relationships between IFs and VRFs of a VPN 130, e.g., VPN 130(1) for HP, at a particular PE, e.g., 250 (1). For illustration purposes, PE 250(1) is connected to CEs 240(1)(1), 240(1)(2), and 240(1)(3) via interfaces IF_130(1)(1), IF_130(1)(2), and IF_130(1)(3), respectively. As a result, with respect to VPN 130(1) and PE 250(1), a VRF, e.g., VRF(1) includes three interfaces IF_130(1)(1), IF_130(1)(2), and IF_130(1)(3). Additionally, CEs 240(1)(1), 240(1)(2), and 240(1)(3) are connected to PE 250(1) via interfaces IF_130(1)(6), IF_130 (1)(7), and IF_130(1)(8), respectively. PE 250(2) and 250(3) are connected to PE 250(1) via IF_130(1)(9), and IF_130(1) (10), respectively. In the example of FIG. 4, PE 250(1) is shown associated with a VPN 130(1), and thus there is one VRF, e.g., VRF(1). However, if PE 250(1) is used by multiple VPNs, e.g., VPN 130(1) to VPN 130(N), then there would be multiple VRFs, e.g., VRF(1) to VRF(N), each corresponding to a VPN 130. Those skilled in the art will recognize that, connections of PEs 250 other than PE 250(1) to other CEs 240 and PEs 250 are in the same manner as illustrated for PE 250(1), e.g., using IFs and associated VRFs.

Figure 5:
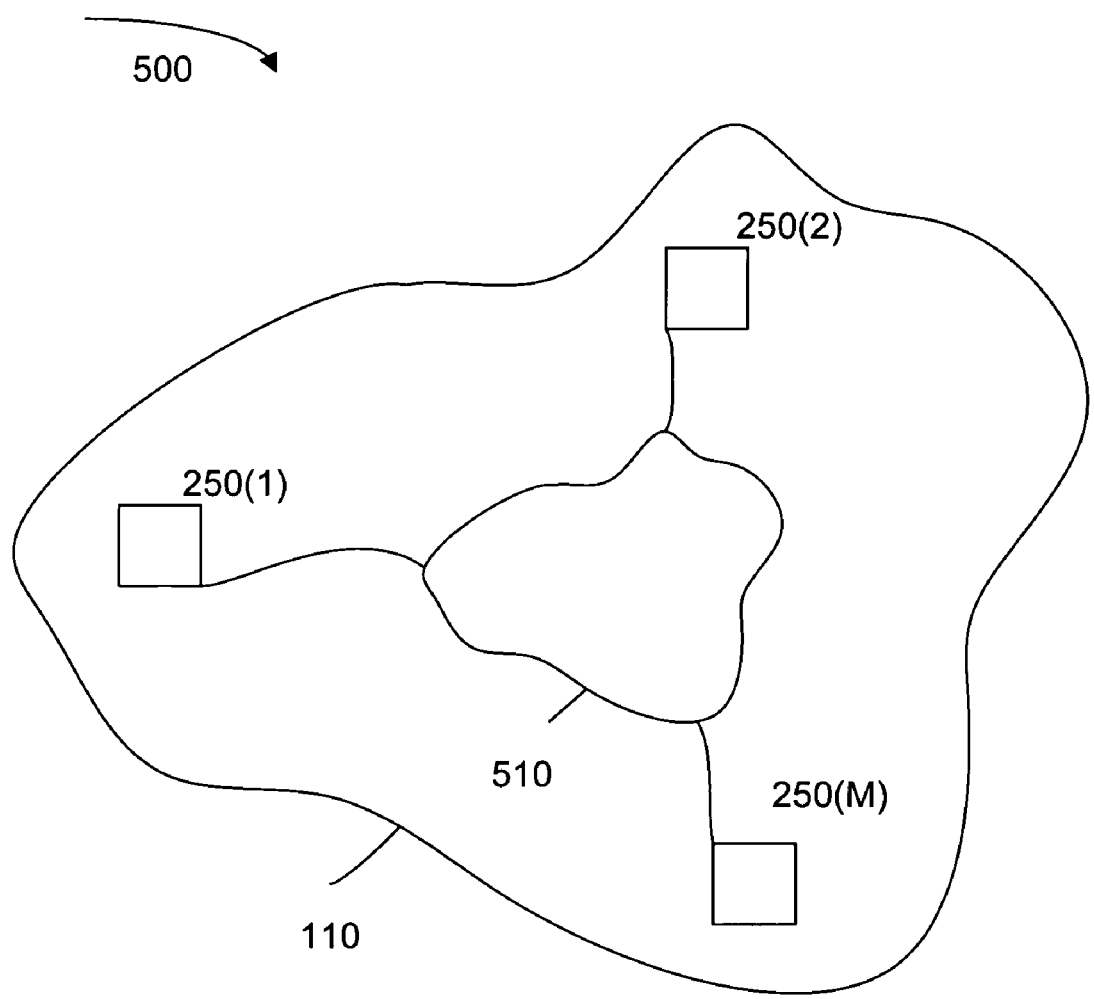
FIG. 5 shows an embodiment of a provider network.

FIG. 5 shows an embodiment 500 of provider network 110. In addition to PEs 250, network 500 includes a sub-network 510 that links PEs 250. Within provider network 110, PEs 250 generally carry data and/or communicate with one another via sub-network 510.

Network With Management System

Figure 6:
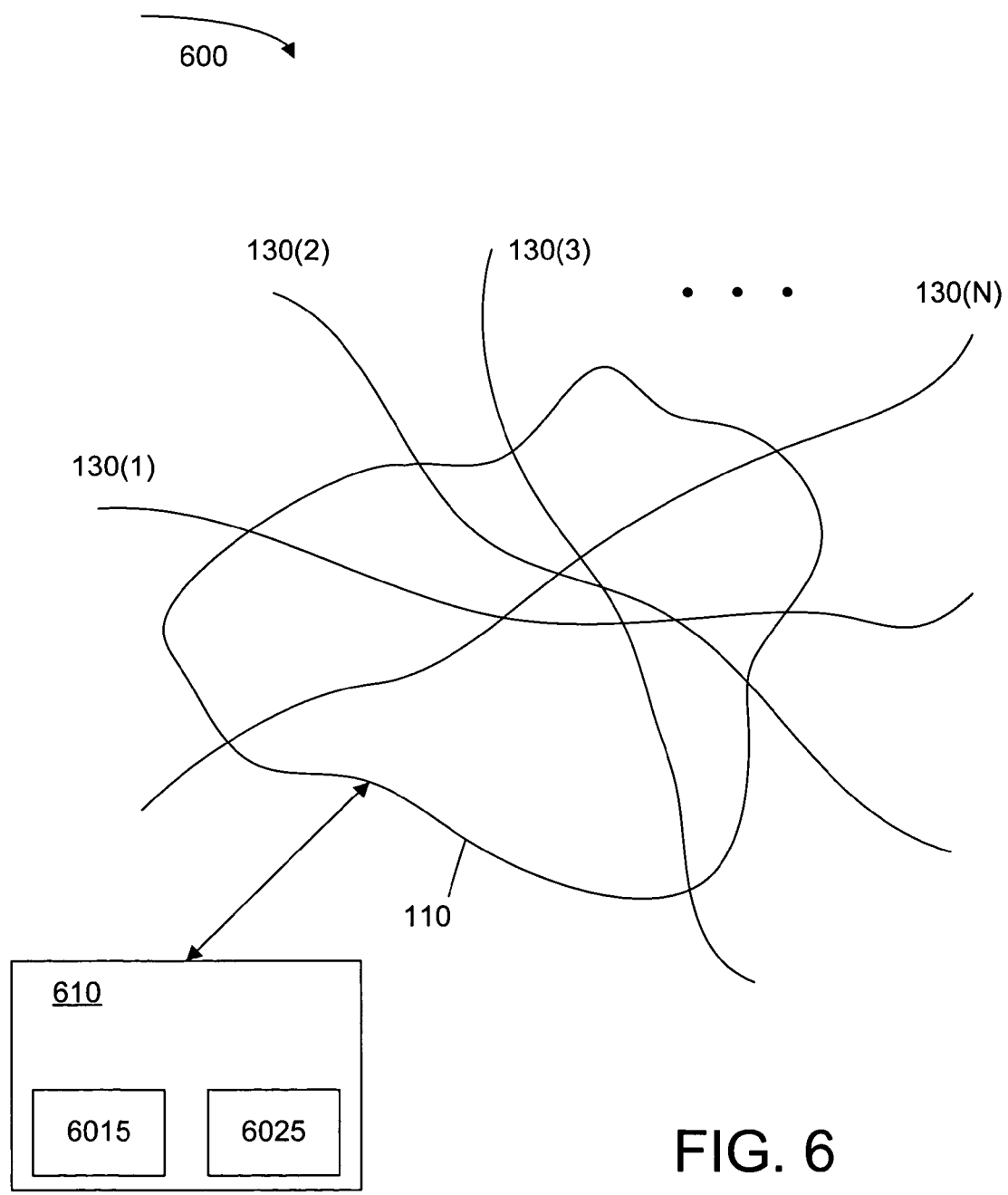
FIG. 6 shows a network embodiment in which the computing network in FIG. 1 is managed by a management system including a management software package and a database.

FIG. 6 shows a network 600, in accordance with an embodiment. Network 600, in addition to being a replicate of network 100, includes a computing system 610 that in turns includes a management software package (MSP) 6015 and a database 6025.

System 610 may be referred to as a management system because it is used to manage network 110. Database 6025 stores information related to network 110 and VPNs 130 served by that network 110. For example, database 6025 stores relationships between VPNs 130 and their PEs 250 and CEs 240 (e.g., the PEs 250 and CEs 240 being used by a particular VPN 130 and their connections); relationships between a PE 250 and its VPN 130, CEs 240, and VRFs (e.g., the VPNs 130 that use a particular PE 250, the VRFs associated with the PE 250 and thus the VPNs 130 that use that PE 250, the CEs 240 interfacing with that PE 250, etc.); relationships between a VRF and its IFs (e.g., with respect to a particular VPN 130 at a particular PE 250, the IFs being associated with the VRF), etc. Related to the example of FIG. 1, database 6025 stores information that network 100 supports VPNs 130(1) to 130(N). Related to the example of FIG. 2, database 6025 stores information that VPN 130(1) uses M number of PEs 250 each corresponding to a CE 240 of a site 210. Related to the example of FIG. 4, database 6025 stores information that VPN 130(1) uses PEs 250(1), 250(2), and 250(3) and that CEs 240(1)(1), 240(1)(2), and 240(1)(3) interface with PE 250(1). Further, with respect to VPN 130(1) and PE 250(1), VRF(1) includes interfaces IF_130(1)(1), IF_130(1)(2), and IF_130(1)(3), etc. Information in database 6025 may be referred to as IF-VRF-VPN logic and CE-IF to VPN logic. With respect to IF-VRF-VPN logic, for a particular PE 250, given an IF, a VRF may be identified, and given a VRF, a VPN 130 may be identified. For example, in FIG. 4, with respect to PE 250(1), given any of the IFs IF_130(1), IF_130(2), and IF_130(3), VRF(1) may be identified; and given VRF(1), VPN 130(1) may be identified. Similarly, given any of the VRFs, the VPN 130 associated with that VRF may be identified, etc. With respect to CE-IF to VPN logic, given a CE 240, the PE 250 interfacing with that CE 240 may be identified, and, given an IF of the CE 240, the IF of the interfacing PE 250 may be identified. Once the IF of the PE 250 and thus the PE 250 are identified, using the IF-VRF-VPN logic, the VPN 130 may be identified. In FIG. 4, given IF IF_130(1)(6) of CE 240(1)(1), IF_130(1)(1) of PE 250(1) may be identified, and, as illustrated above, given IF_130(1)(1), VRF(1) and VPN 130(1) may be identified. In an embodiment, the IF-VRF-VPN and CE-IF to VPN logic of VPNs 130 are stored in a table, but the invention is not limited to such implementation, various ways storing such logic are within the scope of embodiments of the invention.

MSP 6015 performs the following exemplary tasks: event management, status update of VPNs 130, VRFs, IFs, etc. The function provided by MSP 6015 may be performed by software packages as part of MSP 6015 or by independent software packages. MSP 6015 controls and receives information from other software packages, such as the Connectivity Test Package (CTP, not shown), which periodically tests the connectivity between PEs 250 and CEs 240. MSP 6015 has access to CEs 240 and PEs 250 and their VRFs and IFs. Generally, MSP 6015, having information in database 6025 and from various sources provided to it when a problem occurs, identifies the problems/components and/or components/networks impacted by the problematic component.

In an embodiment, MSP 6015 listens to network faults generated by the routers, e.g., CEs 240, PEs 250, etc., and/or other software packages (not shown) and makes an analysis to determine if the faults impact any of the VPN 130. This is done based on the logical relationships between the IFs, VRFs and VPNs 130 stored in database 6025. For example, at runtime, MSP 6015 reads from database 6025 to determine if an IF fault impacts any VRFs and therefore any VPNs 130. MSP 6015 then computes the overall VPN status based on the impacted VRFs, assigns a severity, and generates an event to the user explaining the root cause of the problem and the impacted VPN(s). MSP 6015 also sets the status on the impacted network devices and connections allowing user to visually see the impacted device or connection using a graphical user interface with color coding. The color is determined by the severity setting. A severity of the VPN is determined by MSP 6015 by taking the percentage of the VRFs impacted from the total number of VRFs.

For example, if a PE 250 encounters a problem, then MSP 6015, having such information and information stored in database 6025, identifies all VPNs 130 that use that PE 250 and that are impacted by the problematic PE 250. For another example, if an IF encounters a problem, then MSP 6015, having such information and the IF-VRF-VPN logic in database 6025, identifies all VRFs associated with that problematic IF. Similarly, if a VRF encounters a problem, then MSP 6015, having such information and the IF-VRF-VPN logic in database 6025, identifies the VPNs 130 associated with the problematic VRF, etc.

For further illustration, assume a cable connecting to an IF is disconnected. As a result, the PE 250 associated with that cable generates an event indicating that the IF failed. For example, PE 250(1) generates an event indicating that IF(1) failed. MSP 6015, based on the generated event, identifies the problematic IF(1) and associated VRF, e.g., VRF(1). MSP 6015, in turn, based on the identified VRF(1) identifies the associated VPN 130. MSP 6015 then generates an event indicating that VPN 130(1) failed because IF(1) on PE 250(1) failed.

Determining Root-Cause Problems of Network Components

FIG. 7 shows a table 700 illustrating how root-cause of a problem is identified, in accordance with an embodiment. Column 710C shows a problem/cause. Column 720C shows management events received by MSP 6015 when a problem in column 710C occurs. Column 730C shows actions taken by MSP 6015 in view of the problem in column 710C and information received in column 720C. Information received in column 720C may be from the network node, e.g., PEs 250 and CEs 240, if such node is accessible, e.g., operational. If the node is not accessible, then a control software package (CSP, not shown) provides information that the status of the node is Unknown. Alternatively, if the node is down, the CSP, having not received the heartbeat from the node for a predetermined time, generates an event indicating that the node is down. For example, when an IF of a node is down, but the node is accessible, then the node generates an event indicating that the IF is down. However, if the node and/or the IF is inaccessible, then the CSP, generates an event indicating that the status of the IF is unknown etc. Additionally, the CSP may act as an agent that collects all information from the node and generates the events to MSP 6015. The invention is not limited to how MSP 6015 receives the information. The term "accessible" for a component, e.g., CE 240, refers to whether MSP 6015 has direct access to that particular component, e.g., CE 240. The term "inaccessible" refers to the situation where MSP 6015 does not have direct access to that CE 240, but may access to that CE 240 via the PE 250 interfacing with that CE 240. Whether MSP 6015 has access to a particular network component depends on the authorization of the customers operating/owning that network component. For example, HP operating VPN 130(1) including CEs 240(1)(1), 240(1)(2), and 240(1)(3) may allow MSP 6015 to have access to CEs 240(1)(1), 240(1)(2), but not 240(1)(3), etc.

Depending on situations, MSP 6015 may identify the impacted VPNs 130 by using one or a combination of the CE-IF to VPN and PE IF-VRF-VPN logic. If MSP 6015 identifies the impacted VPNs 130 by both logic, then MSP 6015 co-relate the information from both logic. Alternatively speaking, MSP 6015 confirms the information received from one logic to the information from another logic. For example, MSP 6015, from each of the CE-IF to VPN and IF-VRF-VPN logic, identifies the impacted VPN as VPN 130(1). MSP 6015 then confirms that VPN 130(1) is impacted because the information from both logics co-relate.

In an embodiment, the Connectivity Test Package (CTP) runs on each CE 240 and PE 250, and is controlled by MSP 6015. The CTP periodically tests the connectivity between PEs 250 and between PEs 250 and CEs 240. MSP 6015 then captures the CTP's provided information about the impacted VRFs and/or PEs, and from that information identifies the corresponding impacted VPNs 130. In a PE-PE VRF-unaware test (row 790), the CTP randomly performs a connectivity test from an IF of a source PE 250 and to an IF of a destination PE 250. When the test fails, MSP 6015 receives an event indicating the source and destination PEs 250. With respect to the source PE 250, MSP 6015 identifies all IFs associated with that PE 250, and, for each IF, MSP 6015 uses the IF-VRF-VPN logic to identify a first list of potential impacted VPNs 130. Similarly, with respect to the destination PE 250, MSP 6015 identifies all IFs associated with that destination PE 250. MSP 6015 then also uses the IF-VRF-VPN logic to identify a second list of potential impacted VPNs 130. MSP 6015 eventually selects the intersection of the two lists as the impacted VPN.

In a PE-PE VRF-aware test (row 791), the CTP tests the connectivity between a pair of PEs 250 for a particular VPN 130, using a known VRF of the initiator PE 250. For example, for a pair of PEs 250(1) and 250(2) of VPN 130(1) of HP, the CTP uses VRF(1) to perform the test. When the test fails, the CTP generates an event indicating a connectivity problem from the initiator PE 250(1) to the destination PE 250(2). Because the VRF/VPN associated with the test is known before performing the test and is provided to MSP 6015, when the test fails, MSP 6015 can easily identify the VPN.

In a CE-CE connectivity test (row 792), the CTP performs multiple sub-tests. For illustration purposes, the initiator CE, e.g., CE 240*i*, interfaces with the PE 250*i* while the destination CE, e.g., CE 240*d*, interfaces with the destination PE 250*d*. The CTP performs a connectivity test from the PE 250*i* to the CE 240*i*, a connectivity test from the PE 250*i* to the PE 250*d*, and a connectivity test from the PE 250*d* to the CE 240*d*. When a sub-test fails, MSP 6015 relates the failure of that sub-test to the failure of the CE-CE test as a whole. For example, for a failed PE-CE segment (e.g., PEi-CEi or PEd-CEd), MSP 6015 identifies the impacted VRF and thus VPN.

EXAMPLES

Followings are examples related to table 700 in FIG. 7. Unless otherwise stated, network 400 in FIG. 4 is used in conjunction with table 700. Even though specific examples are not provided for every row in the table, those skilled in the art, however, can easily appreciate embodiments of the invention using the explanation in table 700.

In row 710, for example that CE 240(1)(1) in FIG. 4 is down, e.g., not operational, but the IF, e.g., IF_130(1)(6), used by CE 240(1)(1) to communicate with PE 250(1) is accessible (column 710C). MSP 6015 would receive, from the CSP, an event indicating that CE 240(1)(1) is down (column 720C). MSP 6015 would also receive, from PE 250(1), an event indicating that IF IF_130(1)(1), used by PE 250(1) to communicate with CE 240(1)(1) is down (column 720C). MSP 6015, from the event CE 240(1)(1) down, uses the CE-VPN logic to identify that VPN 130(1) is impacted. Additionally, MSP 6015, from the event that IF IF_130(1)(1) is down, uses the IF-VRF-VPN logic to identify that VRF(1) and thus VPN 130(1) is impacted. MSP 6015, based on the information from both sources, generates an event indicating that VPN 130(1) is impacted by CE 240(1)(1) being down.

In row 720, for example that CE 240(1)(1) is down, but CE 240(1)(1) is accessible. MSP 6015 would receive, from the CSP, an event indicating that CE 240(1)(1) is down. MSP 6015 would also receive, from PE 250(1), an event indicating that IF IF_130(1)(1) is down. In this situation, MSP 6015 behaves similarly to the situation in row 710. MSP 6015, from the event CE 240(1)(1) down, using the CE-VPN logic to identify that VPN 130(1) is impacted. MSP 6015, also from the event that IF IF_130(1)(1) is down, uses the IF-VRF-VPN logic to identify that VRF(1) and thus VPN 130(1) is impacted. MSP 6015, based on the information from both sources, generates an event indicating that VPN 130(1) is impacted by CE 240(1)(1) being down.

In row 730, for example that IF IF_130(1)(6) is down but accessible. MSP 6015 would receive, from PE 250(1), an event indicating that IF IF_130(1)(1) is down. MSP 6015 would receive an event indicating that the status of IF IF_130(1)(6) changes to Unknown. From the event IF_130(1)(6) being unknown, MSP 6015, using the CE-IF to VPN logic, identifies that VPN 130(1) is impacted. From the event IF_130(1)(1) being down, MSP 6015, using the IF-VRF-VPN logic, identifies that VRF(1) and thus VPN 130(1) is impacted. MSP 6015, co-relating information from the two sources, generates an event indicating that VPN 130(1) is impacted.

In row 740, for example that IF IF_130(1)(6) is down and CE 240(1)(1) is accessible. MSP 6015 would receive, from CE 240(1)(1), an event indicating that IF_130(1)(6) is down. MSP 6015 would also receive, from PE 250(1), an event indicating that IF IF_130(1)(1) is down. In this situation, MSP 6015 performs tasks similarly to the situation in row 730. That is, from the event IF_130(1)(6) being down, MSP 6015, using the CE-IF to VPN logic, identifies that VPN 130(1) is impacted. From the event IF_130(1)(1) being down, MSP 6015, using the IF-VRF-VPN logic, identifies that VRF (1) and thus VPN 130(1) is impacted. MSP 6015, co-relating information from the two sources, generates an event indicating that VPN 130(1) is impacted.

In row 750, for example that PE 250(2) is down and the CEs 240 (not shown) associated with PE 250(2) are not accessible. For illustration purposes, PE 250(2) are associated with PE IFs IF_1, IF_2, and IF_3, which correspond to VPN 130(1), 130(2), and 130(3), respectively. MSP 6015 would receive from the CSP an event indicating that PE 250(2) is down. MSP 6015, from this event PE 250(2) being down, identifies all IFs associated with this PE 250(2), which are IF_1, IF_2, and IF_3. For each IF_1, IF_2, and IF_3, MSP 6015, using the IF-VRF-VPN logic, identifies the impacted VPN 130(1), 130(2), and 130(3), respectively. MSP 6015 then generates an event indicating VPNs 130(1), 130(2), and 130(3) being impacted.

In row 760, for example that PE 250(3) is down and CE_1, CE_2, and CE_3 (not shown) associated with PE(3) are accessible. For illustration purposes, PE 250(3) is associated with IF_1, IF_2, and IF_3, which correspond to VPN 130(1), 130(2), and 130(3), respectively. Further, CE_1, CE_2, and CE_3 use CE_IF_1, CE_IF_2, and CE_IF_3, respectively, to communicate with PE 250(3). MSP 6015 would receive from the CSP an event indicating that PE 250(3) is down and an event, from CE_1 CE_2, and CE_3 indicating that CE_IF_1, CE_IF_2, and CE_IF_3, respectively, are down. Upon receiving the event indicating that PE 250(3) is down, MSP 6015 identifies all PE IFs associated with PE 250(3), which are IF_1, IF_2, and IF_3. For each IF_1, IF_2, and IF_3, MSP 6015, using the IF-VRF-VPN logic, identifies the impacted VPNs 130(1), 130(2), and 130(3), respectively. Additionally, from the events indicating that CE_IF_1, CE_IF_2, and CE_IF_3 are down, MSP 6015, using the CE-IF to VPN logic, identifies VPN 130(1), 130(2), and 130(3) are impacted. Based on the information from the two sources that co-relates, MSP 6015 generates an event indicating that VPN 130 (1), 130(2), and 130(3) are impacted.

In row 770, for example that IF IF_130(1)(3) is down and CE 240(1)(3) is not accessible. MSP 6015 would receive, from PE 250(1), an event indicating that IF IF_130(1)(3) is down, MSP 6015 from this event and the IF-VRF-VPN logic, generates an event indicating that VPN 130(1) is impacted. Because IF IF_130(1)(3) is down and CE 240(1)(3) is not accessible, CE 240(1)(3) status changes to Unknown. MSP 6015 captures this status, and, together with the CE-IF to VPN logic, generates an event indicating that VPN 130(1) is impacted. Since the two events correlate, e.g., both events indicating that VPN 130(1) is impacted, MSP 6015 combines them into one event indicating VPN 130(1) being impacted by IF IF_130(1)(3)

In row 780, for example that IF IF_130(1)(1) is down and CE 240(1)(1) is accessible. MSP 6015 would receive, from PE 250(1), an event indicating that IF IF_130(1)(1) is down, and, from CE 240(1)(1), an event indicating that IF IF_130(1)(6) is down. From the event that IF_130(1)(1) is down, MSP 6015, from the IF-VRF-VPN logic, identifies that VPN 130(1) is impacted. From the event that IF_130(1)(6) is down, MSP 6015, using the CE-IF to VPN logic, also determines that VPN 130(1) is impacted. Because the two events co-relate, MSP 6015, generates an event indicating that VPN 130(1) is impacted.

In row 790, for example that the unaware PE-PE test from PE 250(2) to 250(3) fails. For illustration purposes, PE 250(2) is used by VPNs 130(1), 130(2), and 130(4) while PE 250(3) is used by VPNs 130(1), 130(3), and 130(4). MSP 6015 would receive from the CTP a timeout indicating that the connectivity test from PE 250(2) to 250(3) fails. With respect to PE 250(2), MSP 6015, for each of the associated IFs, uses the IF-VRF-VPN logic to identify that VPN 130(1), 130(2), and 130(4) are potentially impacted. Similarly, with respect to PE 250(3), MSP 6015, for each of the associated IFs, uses the IF-VRF-VPN logic to identify that VPN 130(1), 130(3), and 130(4) are potentially impacted. MSP 6015, from the two lists of potentially impacted VPNs, identifies that VPNs 130(1) and 130(4), which are the intersection of the two lists, are impacted.

In row 791, for example that the PE-PE VRF aware test between the pair of PEs 250(1) and 250(2) of VPN 130(1) fails. Further, VRF(1) is used in the test. MSP 6015 receives from the CTP a timeout indicating a connectivity failure from PE 250(1) to destination PE 250(2). From this information and the information that VRF(1) was used in the test, MSP 6015, using the VRF-VPN logic, identifies that VPN 130(1) is impacted.

Classifying Faults

In an embodiment, problems related to network 100 are characterized as "infrastructure" and "reachability." Infrastructure relates to hardware such as the nodes in network 100, the IFs, VRFs, CEs 240, PEs 250, etc. Reachability relates to connectivity, such as the connection between two PEs, between a PE and a CE, etc. If a PE IF encounters a problem, its infrastructure status and the infrastructure status of its corresponding VRF change to critical. Similarly, if an IF encounters a reachabiltiy problem, its reachabiltiy status and the reachability status of the corresponding VRF change to critical. However, the status of a VPN depends on the seriousness level of both the infrastructure and reachability status of the corresponding VRFs. A status manager in the form of a software package, which is part of MSP 6015 in an embodiment, sets the status of a VPN based on the following compounding rule. Node and interface fault events affect the infrastructure status of the IF/VRF while the CTP connectivity tests affect the reachability status of the IF/VRF. The overall status is computed from these two statuses.

Seriousness of an infrastructure and connectivity fault is characterized by levels including normal, marginal, warning, major critical, etc., and is based on the problem percentage. For example, if there are 5 VRFs in a VPN, and if one, two, or three 3 VRFs fail, then the problem percentage is 20%, 40%, and 60%, respectively. The problem percentage is 0, 1-24%, 25%-49%, 50-89%, and 90% or more for normal, marginal, warning, major, and critical, respectively.

The seriousness level of a VPN is based on the combined seriousness level of the infrastructure and reachability of the VPN's VRFs as follows:

(Critical+<Any seriousness level>=Critical)

Critical+Critical=Critical

Critical+Major=Critical

Critical+Warning=Critical

Critical+Marginal=Critical

Critical+Normal=Critical

Major+Major=Major

Major+Warning=Major

Major+Marginal=Major

Major+Normal=Warning

Warning+Warning=Warning

Warning+Marginal=Warning

Warning+Normal=Warning

Marginal+Normal=Marginal

Determining Status of Network Component

FIG. 8 shows a table related to the status of network components, in accordance with an embodiment. Rows 810-892 of column 810C correspond to rows 710-792 of column 710C in FIG. 7, i.e., they indicate a problem/cause. Column 820C shows status of various components received by MSP 6015 when a problem in column 810C occurs. Column 830C shows actions taken by MSP 6015 in relation to the status of the various network components in view of the problem in column 810C. For illustration purposes, "INF" refers to infrastructure while "CON" refers to reachability.

The following examples use the same examples as in rows 710-792. As in the example of FIG. 7, examples are not provided for every row. However, those skilled in the art can easily appreciate embodiments of the invention using the text in table 800.

In row 810, if CE 240(1)(1) is down, but IF_130(1)(6) is accessible, MSP 6015 would receive an event indicating that the status of CE 240(1)(1) being Unknown and an event indicating that IF_130(1)(1) is down. Based on the event that IF_130(1)(1) being down, MSP 6015 sets the INF status of IF_130(1)(1) and of VRF(1) to Critical. Based on the status of CE 240(1)(1) being unknown, MSP 6015 sets the CON status of IF_130(1)(1) and of VRF(1) to Critical. MSP 6015 then calculates the status of VPN(1) based on the INF and CON status of VRF(1).

In row 820, if CE 240(1)(1) is down, but CE 240(1)(1) is accessible, then MSP 6015 would receive an event indicating that CE 240(1)(1) is down and an event indicating that IF_130(1)(1) is down. Based on the event that IF_130(1)(1) being down, MSP 6015 sets the INF status of IF_130(1)(1) and of VRF(1) to Critical. Based on the status of CE 240(1)(1) being unknown, MSP 6015 sets the CON status of IF_130(1)(1) and of VRF(1) to Critical. MSP 6015 then calculates the status of VPN(1) based on the INF and CON status of VRF(1).

In row 830, if IF IF_130(1)(6) is down but accessible, then MSP 6015 would receive an event indicating that IF_130(1)(6) is down. MSP 6015 would also receive an event indicating that IF_130(1)(1) is down. Based on the event that IF_130(1)(1) being down, MSP 6015 sets the INF status of IF_130(1)(1) and of VRF(1) as Critical. Based on the event that IF_130(10(6) being down, MSP 6015 sets the CON status of IF_130(1)(1) and of VRF(1) to Critical. MSP 6015 then calculates the status of VPN(1) based on the INF and CON status of VRF(1).

In row 840, if IF IF_130(1)(6) is down and CE 240(1)(1) is accessible, then MSP 6015 would receive an event indicating that IF_130(1)(6) being down and an event indicating that IF_130(1)(1) being down. Based on the event that IF_130(1)(1) being down, MSP 6015 sets the INF status of IF_130(1)(1) and of VRF(1) as Critical. Based on the event that IF_130(1)(6) being down, MSP 6015 sets the CON status of IF_130(1)(1) and of VRF(1) to Critical. MSP 6015 then calculates the status of VPN(1) based on the INF and CON status of VRF(1).

In row 870, if IF_130(1)(3) is down and CE 240(1)(3) is not accessible, then MSP 6015 would receive an event indicating that IF_130(1)(3) is down and an event indicating that the status of CE 240(1)(3) and thus of IF_130(1)(8) as Unknown. Based on the event that IF_130(1)(3) being down, MSP 6015 sets the INF status of IF_130(1)(3) and of VRF(1) to Critical. Based on the status of CE 240(1)(3) being Unknown, MSP 6015 sets the CON status of IF_130(1)(3) and of VRF(1) to Critical. MSP 6015 then calculates the status of VPN(1) based on the INF and CON status of VRF(1).

In row 880, if IF_130(1)(1) is down and CE 240(1)(1) is accessible, then MSP 6015 would receive an event indicating that IF_130(1)(1) being down and an event indicating that IF_130(1)(6) being down. Based on the event that IF_130(1)(1) being down, MSP 6015 sets the INF status of IF_130(1)(1) and of VRF(1) to Critical. Based on the status of IF_130(1)(6) being down, MSP 6015 sets the CON status of IF_130(1)(1) and of VRF(1) to Critical. MSP 6015 then calculates the status of VPN(1) based on the INF and CON status of VRF(1).

Displaying Network Information

In an embodiment, network 100 including CEs 240, PEs 250, and VPNs 130 is shown in a display for visual purposes. VPNs 130 and network components each are represented by a color, and when a section of a network and/or a network component encounters a problem, e.g., fails, that problematic section/component changes to a different color. By looking at the system with colors, a user may quickly identify the problem, e.g., a connectivity problem between a first and a second PE 250; a problematic IF of a CE 240, a PE 250; the problematic CEs 240, PEs 250, etc. A GUI interface is used to represent the network and its components by the colors and programs are written to change the color when a problem arises.

Embodiments of the invention are advantageous over other approaches because various root-cause problems may be identified near real time. For example, the impact network faults on system 100 may be determined near real time; the root-cause of the network may be analyzed near real time; the status showing the availability of the service based on underlying network device status may be computed near real time; the faults to determine the location of the failure for connectivity issue may be diagnosed near real time, which helps reduces the mean time to repair (MTTR).

Computer System Overview

Figure 9:
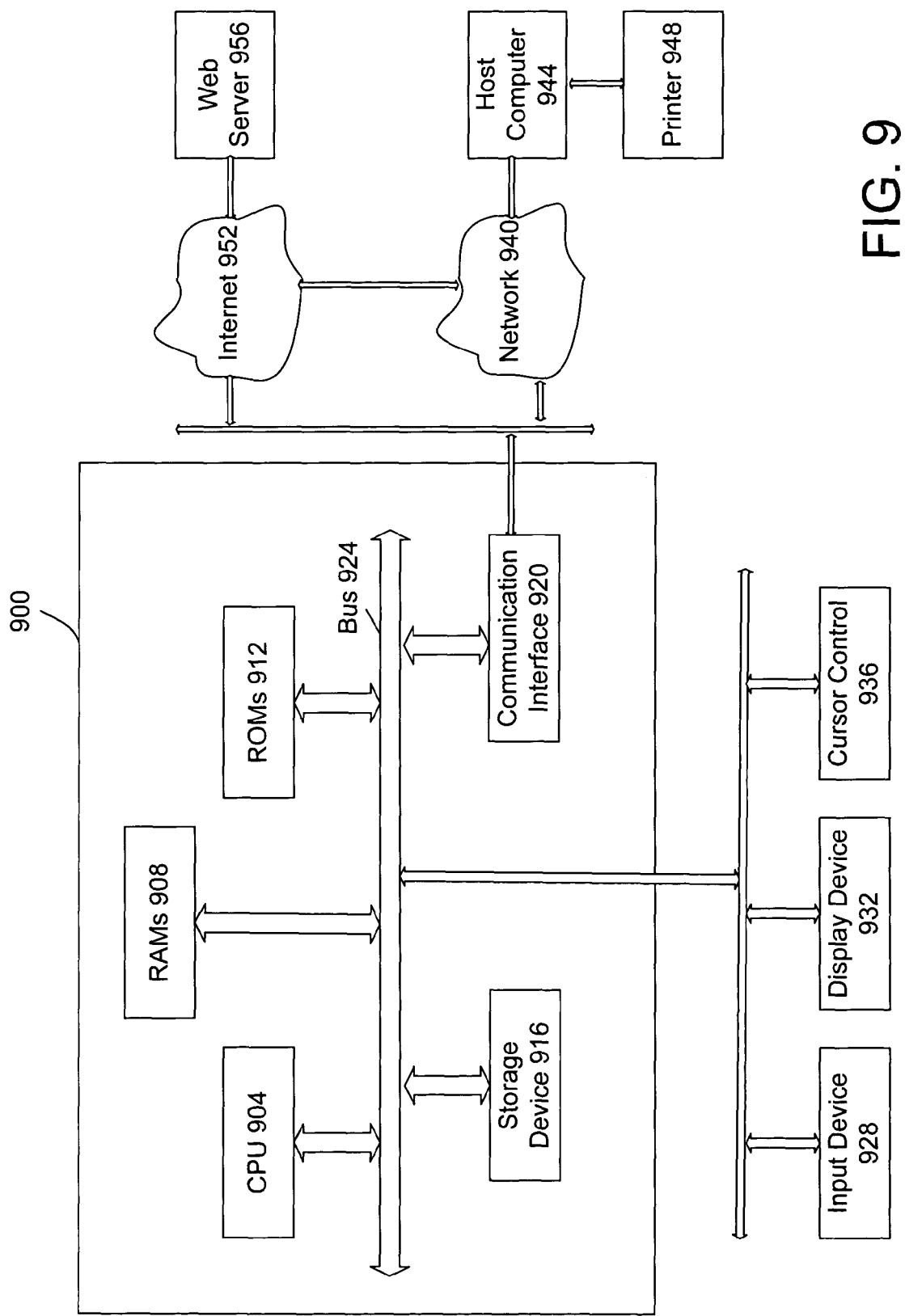
FIG. 9 shows a computer system, in accordance with an embodiment.

FIG. 9 is a block diagram showing a computer system 900 upon which embodiments of the invention may be implemented. For example, computer system 900 may be implemented to operate as a computing system 610, to run MSP 6105, to access database 6205, to perform functions in accordance with the techniques described above, etc. In an embodiment, computer system 900 includes a central processing unit (CPU) 904, random access memories (RAMs) 908, read-only memories (ROMs) 912, a storage device 916, and a communication interface 920, all of which are connected to a bus 924.

CPU 904 controls logic, processes information, and coordinates activities within computer system 900. In an embodiment, CPU 904 executes instructions stored in RAMs 908 and ROMs 912, by, for example, coordinating the movement of data from input device 928 to display device 932. CPU 904 may include one or a plurality of processors.

RAMs 908, usually being referred to as main memory, temporarily store information and instructions to be executed by CPU 904. Information in RAMs 908 may be obtained from input device 928 or generated by CPU 904 as part of the algorithmic processes required by the instructions that are executed by CPU 904.

ROMs 912 store information and instructions that, once written in a ROM chip, are read-only and are not modified or removed. In an embodiment, ROMs 912 store commands for configurations and initial operations of computer system 900.

Storage device 916, such as floppy disks, disk drives, or tape drives, durably stores information for use by computer system 900.

Communication interface 920 enables computer system 900 to interface with other computers or devices. Communication interface 920 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 920 may also allow wireless communications.

Bus 924 can be any communication mechanism for communicating information for use by computer system 900. In the example of FIG. 9, bus 924 is a media for transferring data between CPU 904, RAMs 908, ROMs 912, storage device 916, communication interface 920, etc.

Computer system 900 is typically coupled to an input device 928, a display device 932, and a cursor control 936. Input device 928, such as a keyboard including alphanumeric and other keys, communicates information and commands to CPU 904. Display device 932, such as a cathode ray tube (CRT), displays information to users of computer system 900. Cursor control 936, such as a mouse, a trackball, or cursor direction keys, communicates direction information and commands to CPU 904 and controls cursor movement on display device 932.

Computer system 900 may communicate with other computers or devices through one or more networks. For example, computer system 900, using communication interface 920, communicates through a network 940 to another computer 944 connected to a printer 948, or through the world wide web 952 to a server 956. The world wide web 952 is commonly referred to as the "Internet." Alternatively, computer system 900 may access the Internet 952 via network 940.

Computer system 900 may be used to implement the techniques described above. In various embodiments, CPU 904 performs the steps of the techniques by executing instructions brought to RAMs 908. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 904 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 904 are in the form of one or more software programs and are initially stored in a CD-ROM being interfaced with computer system 900 via bus 924. Computer system 900 loads these instructions in RAMs 908, executes some instructions, and sends some instructions via communication interface 920, a modem, and a telephone line to a network, e.g. network 940, the Internet 952, etc. A remote computer, receiving data through a network cable, executes the received instructions and sends the data to computer system 900 to be stored in storage device 916.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A system, comprising:
    a maintenance software package embodied on a non-transitory computer readable medium that accesses a database storing connection information among:
        a first virtual private network and a first provider edge router (PE);
        the first PE and a second PE;
        the first PE and a first customer edge router (CE);
        a first PE-PE interface of the first PE and a first PE-PE interface of the second PE;
        a first PE-CE interface of the first PE and a first CE-PE interface of the first CE;
        a first virtual routing address and the first PE-CE interface; and
        the first virtual routing address and the first virtual private network; and
    the maintenance software package embodied on a non-transitory computer readable medium operable to identify the first virtual private network from connection information between the first PE-CE interface and the first virtual routing address and connection information between the first virtual routing address and the first virtual private network, and if the first CE is in-operational, then the maintenance software package embodied on a non-transitory computer readable medium identifies the first virtual private network as impacted by the first CE.

2. The system of claim 1 wherein, if the first CE is in-operational, then the first virtual private network is identified as impacted by the first CE from connection information stored in the database related to the first CE-PE interface.

3. The system of claim 1 wherein, if the first CE-PE interface is in-operational, then from connection information for the first PE-CE interface, the first virtual private network is identified as impacted by the first CE-PE interface.

4. The system of claim 1 wherein, if the first CE-PE interface is in-operational, then from this information and connection information in the database for the first CE-PE interface, the first virtual private network is identified as impacted by the first CE-PE interface.

5. The system of claim 1 wherein, if the first PE is in-operational, then from connection information related to the first PE-CE interface, the first virtual private network is identified as impacted by the first PE.

6. The system of claim 1 wherein, if the first PE is in-operational, then from connection information related to the first PE-PE interface, the first virtual private network is identified as impacted by the first PE.

7. The system of claim 1 wherein if a PE is in-operational, then from connection information related to interfaces associated with this PE, and connection information stored in the database for the interfaces, virtual private networks impacted by this PE are identified.

8. The system of claim 1 wherein if a PE is in-operational, then from connection information related to interfaces used by CEs interfacing with this PE, connection information stored in the database for these interfaces, virtual private networks impacted by this PE are identified.

9. The system of claim 1 wherein if the first PE-CE is in-operational, then from this information, the first virtual private network is identified as being impacted by the first PE-CE.

10. The system of claim 1 wherein if the first PE-CE is in-operational, then from connection information for the first CE-PE and connection information stored in the database for the first CE-PE, the first virtual private network is identified as being impacted by the first PE-CE.

11. The system of claim 1 wherein, from results of a PE-PE virtual routing address unaware test, a first list of virtual private networks associated with an initiator PE and a second list of virtual private networks associated with a destination PE are identified; a virtual private network being in both the first list and the second list is identified as an impacted virtual private network.

12. The system of claim 1 wherein, from results of a PE-PE virtual routing address aware test, the first virtual private network is identified as being impacted.

13. The system of claim 1 wherein a reachability test from the first CE to a second CE includes reachability test between the first PE and the first CE, between the first PE and the second PE, and between the second PE and a second CE.

14. A computing network comprising:
    a provider network that includes a plurality of provider edge routers;
    a plurality of virtual private networks each of which links a plurality of site networks and is virtually private to those site networks;
    a site network includes a customer edge router;
    a first provider edge router uses a first PE-PE interface to interface with a first PE-PE interface of a second provider edge router, and uses a first PE-CE interface to interface with a first CE-PE interface of a first customer edge router;

with respect to a first virtual private network using the first provider edge router, a first virtual routing address logically groups at least the first PE-CE interface;

a maintenance software program embodied on a non-transitory computer readable medium, for accessing a database configured to store connection information between the first virtual private network and the first provider edge router; between the first provider edge router and the second provider edge router; between the first provider edge router and the first customer edge router; between the first PE-CE interface and the first, CE-PE interface; and between the first virtual routing address and the first PE-CE interface; and the maintenance software program embodied on a non-transitory computer readable medium identifies the virtual private networks from the connection information between the first PE-CE interface and the first virtual routing address and connection information between the first virtual routing address and the first virtual private network, wherein if the first CE is in-operational, then the first virtual private network is identified as impacted by the first CE from information stored in the database related to the first CE-PE interface.

15. The computing network of claim 14 wherein the provider edge routers communicate with one another via a sub-network.

16. The computing network of claim 14 wherein a private virtual network of the plurality of the virtual private networks uses the multiple-protocol-label-switching technology.

17. The computing network of claim 14 wherein the second provider edge router uses a second PE-CE interface to interface with a second CE-PE interface of a second customer edge router.

18. The computing network of claim 17 wherein the first customer edge router and the second edge router belong to the first virtual private network.

19. The computing network of claim 17 wherein the first customer edge router belongs to first virtual private network and the second customer edge router belongs to a second virtual private network distinguished from the first virtual private network.

20. The computing network of claim 14 wherein from the connection information stored in the database, if connection information from either the first PE-PE interface or the first PE-CE interface is provided, then one or a combination of the following is identified: the virtual routing address and the virtual private network associated with the virtual routing address.

21. The computing network of claim 14 wherein from the connection information stored in the database, if connection information from the first CE-PE interface is provided, then the first PE-CE is identified.

22. A method, implemented by a maintenances software program embodied on a non-transitory computer readable medium, for determining whether a virtual private network is impacted by a fault, comprising:

the maintenance software program embodied on a non-transitory computer readable medium storing, in a database, connection information between a virtual routing address and interfaces logically grouped by the virtual routing address;

the maintenance software program embodied on a non-transitory computer readable medium storing, in the database, connection information between the virtual routing address and the virtual private network;

when the fault occurs, the maintenance software program embodied on a non-transitory computer readable medium identifying an interface impacted by the fault;

from the stored connection information between the impacted interface and a virtual routing address, the maintenance software program embodied on a non-transitory computer readable medium identifying the virtual routing address as being impacted; and from the stored connection information between the impacted virtual routing address and the virtual private network, the maintenance software program embodied on a non-transitory computer readable medium identifying the virtual private network as being impacted if a first CE is in-operational.

23. The method of claim 22 wherein faults related to an interface and to the virtual private network are classified by the maintenance software program embodied on a non-transitory computer readable medium into a plurality of levels each being represented by a color.

24. The method of claim 22 wherein the interfaces are used by a provider edge router in a provider network providing service to the virtual private network.

25. A non-transitory computer-readable medium embodying program code to perform a method for determining whether a virtual private network is impacted by a fault, the method comprising:

storing, in a database, connection information between a virtual routing address and interfaces logically grouped by the virtual routing address;

storing, in the data base, connection information between the virtual routing address and the virtual private network; when the fault occurs, identifying an interface impacted by the fault;

from the stored connection information between the impacted interface and a virtual routing address, identifying the virtual routing address as being impacted;

from the stored connection information between the impacted virtual routing address and the virtual private network, identifying the virtual private network as being impacted if a first CE is in-operational.

26. The non-transitory computer-readable medium of claim 25 wherein faults related to an interface and to the virtual private network are classified into a plurality of levels each being represented by a color.

27. The non-transitory computer-readable medium of claim 25 wherein the interfaces are used by a provider edge router in a provider network providing service to the virtual private network.

* * * * *